(12) United States Patent
Bender (10) Patent No.: US 9,788,691 B1
(45) Date of Patent: Oct. 17, 2017

(54) ELECTRIC MIXER HAVING CLAMPING FEATURES

(71) Applicant: Joseph Bender, The Villages, FL (US)

(72) Inventor: Joseph Bender, The Villages, FL (US)

(73) Assignee: Joseph Bender, Kissimmee, FL (US)

( * ) Notice: Subject to any disclaimer, the term of this patent is extended or adjusted under 35 U.S.C. 154(b) by 148 days.

(21) Appl. No.: 14/672,993

(22) Filed: Mar. 30, 2015

Related U.S. Application Data (63) Continuation-in-part of application No. 13/762,733, filed on Feb. 8, 2013, now abandoned.

(51) Int. Cl.
*A47J 43/07* (2006.01)
*B01F 15/00* (2006.01)
*B01F 7/00* (2006.01)

(52) U.S. Cl.
CPC ............ *A47J 43/07* (2013.01); *B01F 7/0025* (2013.01); *B01F 15/00538* (2013.01); *B01F 2215/0014* (2013.01)

(58) Field of Classification Search
CPC .................... A47J 43/07; A47J 43/0705; A47J 2043/0449; A47J 36/165; B01F 7/00208
USPC ................. 366/251, 307, 331, 282
See application file for complete search history.

(56) References Cited

U.S. PATENT DOCUMENTS

| | | | |
|---|---|---|---|
| 3,357,685 A * | 12/1967 | Stephens | A47J 36/165 366/282 |
| 4,184,779 A | 1/1980 | Detmer | |
| 4,339,992 A * | 7/1982 | Kurland | A47J 36/165 366/342 |
| D341,291 S | 11/1993 | Dow, III | |
| 5,372,422 A * | 12/1994 | Dubroy | A47J 36/165 366/143 |
| 5,613,425 A | 3/1997 | Krznaric | |
| 5,765,947 A | 6/1998 | Dubroy | |
| 5,816,136 A | 10/1998 | Stallings | |
| 5,863,121 A * | 1/1999 | Dunk | A47J 36/165 366/282 |
| 6,113,258 A | 9/2000 | Ardent | |
| 6,286,990 B1 | 9/2001 | De Zuazo Torres | |
| 6,712,498 B1 * | 3/2004 | Yang | B01F 13/002 366/282 |
| 7,607,820 B2 | 10/2009 | Krzywdziak | |
| 7,950,844 B2 | 5/2011 | Murray | |
| 2010/0260005 A1 * | 10/2010 | Bodum | A47J 43/0465 366/144 |
| 2012/0147696 A1 * | 6/2012 | Swader | B01F 7/165 366/249 |
| 2013/0215708 A1 * | 8/2013 | Davis | A47J 36/165 366/331 |

FOREIGN PATENT DOCUMENTS

FR        2886831 A1 * 12/2006 .......... A47J 27/0806

* cited by examiner

*Primary Examiner* — Charles Cooley
*Assistant Examiner* — Marc C Howell (57) ABSTRACT

An electric mixer can include a motor, an interchangeable paddle assembly, and a mounting plate. The mounting plate attaches to the top of a cooking vessel and includes a pair of clamping plates adapted to span a diameter of various size cooking vessels. The motor is attached to the mounting plate and is operably connected to the paddle assembly providing power to rotate the paddle and stir the contents of the cooking vessel.

9 Claims, 7 Drawing Sheets

ELECTRIC MIXER HAVING CLAMPING FEATURES

RELATED APPLICATIONS

The present invention is a continuation-in-part of and claims the benefit of U.S. application Ser. No. 13/762,733, filed Feb. 8, 2013, the entire disclosures of which are incorporated herein by reference.

FIELD OF THE INVENTION

The present invention relates generally to mixers, and in particular, to an electric mixer utilized for continuous unattended stirring or mixing of the contents of a cooking vessel.

BACKGROUND OF THE INVENTION

As any culinary person will surely attest, whether it be a professional chef or the casual, at-home cook, stirring of cooking food is one (1) of the little known, but important secrets that differentiate good food, from great food. While many times, simple occasional stirring with suffice, there are times that almost continuous stirring is required, such as foods or sauces at high temperatures, or those that are easily burned or scalded. Sometimes the cook or a helper can be dedicated to do continuous stirring, but many times other duties interfere, or such a helper is not available. Even if the time is available, one's arms quickly become tired when held at an outstretched length for a long period of time.

Accordingly, there exists a need for a means by which the contents of a pot can be continuously stirred, without the disadvantages as described above.

SUMMARY OF THE INVENTION

The inventor has recognized the aforementioned inherent problems and lack in the art and observed that there is a need for a device that can easily and continuously stir or mix foodstuffs within a cooking vessel, such as a pot. The development of the present invention, which will be described in greater detail herein, substantially departs from conventional solutions to provide an electric mixer and in doing so fulfills this need.

In one (1) embodiment, the disclosed electric mixer can include a mounting plate, at least one (1) pair of opposed clamping plates extending radially from the mounting plate, a motor assembly attached to the mounting plate, and an interchangeable paddle assembly mechanically connected to the motor assembly.

In another embodiment, the disclosed electric mixer can include a mounting plate, a first clamping plate and an opposed second clamping plate extending radially from the mounting plate, a motor assembly attached to the mounting plate, and an interchangeable paddle assembly mechanically connected to the motor assembly.

In another embodiment, the disclosed electric mixer can include a motor assembly including a motor housing attached to the mounting plate, a motor disposed within the motor housing, a gear-based speed reduction system, a hollow sleeve, and a sliding shaft including an upper end received by the hollow sleeve and a lower end extending downwardly from the hollow shaft, wherein the paddle assembly is attached to said shaft.

In another embodiment, the disclosed electric mixer can include a paddle assembly including a central hub attached to the shaft lower end, a first blade extending outwardly from the central hub and, a second blade extending outwardly from the central hub opposite the first blade.

Furthermore, the described features and advantages of the disclosed electric mixer can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY 10 electric mixer
20 mounting plate having opposed tubes
22 aperture
24 rod
26a first clamping plate
26b second clamping plate
31 retention spring
50 mixing paddle assembly
52 first blade
54 second blade
56 hub
58 curve feature
60 first fastener
70 motor assembly
71 dome shaped cover
72 gear reduction brushless motor
73 hollow sleeve
74 shaft
75 shaft gear
76 motor housing
77 vent
79 motor gear
80 clip assembly
82 variable speed switch with integral power switch
84 wiring
85 variable speed control board
86 ball-end feature
87 interior bottom surface
88 travel path "t"
89 paddle approach angle "a"
90 power cord 92 power plug with low voltage transformer
100 safety connector
100a first half connector
100b second half connector 102 pin
104 socket
106a first magnet
106b second magnet
200 cooking vessel
205 food stuff

DETAILED DESCRIPTION OF THE PREFERRED EMBODIMENT

In accordance with the invention, the best mode is presented in terms of the described embodiments, herein depicted within FIGS. 1 through 7. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 7, disclosing an electric mixing apparatus (herein referred to generally as an "apparatus") 10, where like reference numerals represent similar or like parts. Generally, the device 10 provides for automatic stirring for use in a variety of cooking vessels 200 to aid in cooking of food stuffs 205. The apparatus 10 includes a mounting plate having opposed tubes 20 which entraps opposing sides of the cooking vessel 200 to secure the apparatus 10 at a top portion of the cooking vessel 200. The mounting plate having opposed tubes 20 supports an electric gear reduction brushless motor 72, similar in size to that of a drill motor, which drives a "T"-shaped paddle assembly 50 that protrudes downwardly into the vessel 200. Said rotational mechanical motion is accomplished by a shaft gear 75 and a motor gear 79 operating in a conventional gear based speed reduction manner. The shaft gear 75 is attached to a hollow sleeve 73 while the motor gear 79 is attached to the gear reduction brushless motor 72. The brushless design of the gear education brushless motor 72 is envisioned to provide for quiet, smooth, and reduced vibration operation of the apparatus 10. The paddle assembly 50 includes a pair of attached blades 52 and 54. Said paddle assembly 50 is interchangeable and made available in multiple sizes to fit differently shaped cooking vessels 200. Possible envisioned widths include seven inches (7 in.), nine inches (9 in.), eleven inches (11 in.), and thirteen inches (13 in.). However, the inclusion or omission of specific widths is not intended to be a limiting factor of the present invention. While the specific size, shape and configuration of the cooking vessel 200 is not intended to be a limiting factor of the present invention, a typical cooking vessel 200 would range in size from nine inches to fourteen inches (9-14 in.) in diameter and six to sixteen inches (6-16 in.) in depth. Usage upon cooking vessels 200 of a lower depth is not advised due to possible damage to the apparatus 10 due to close proximity of the heating source.

Figure 1:
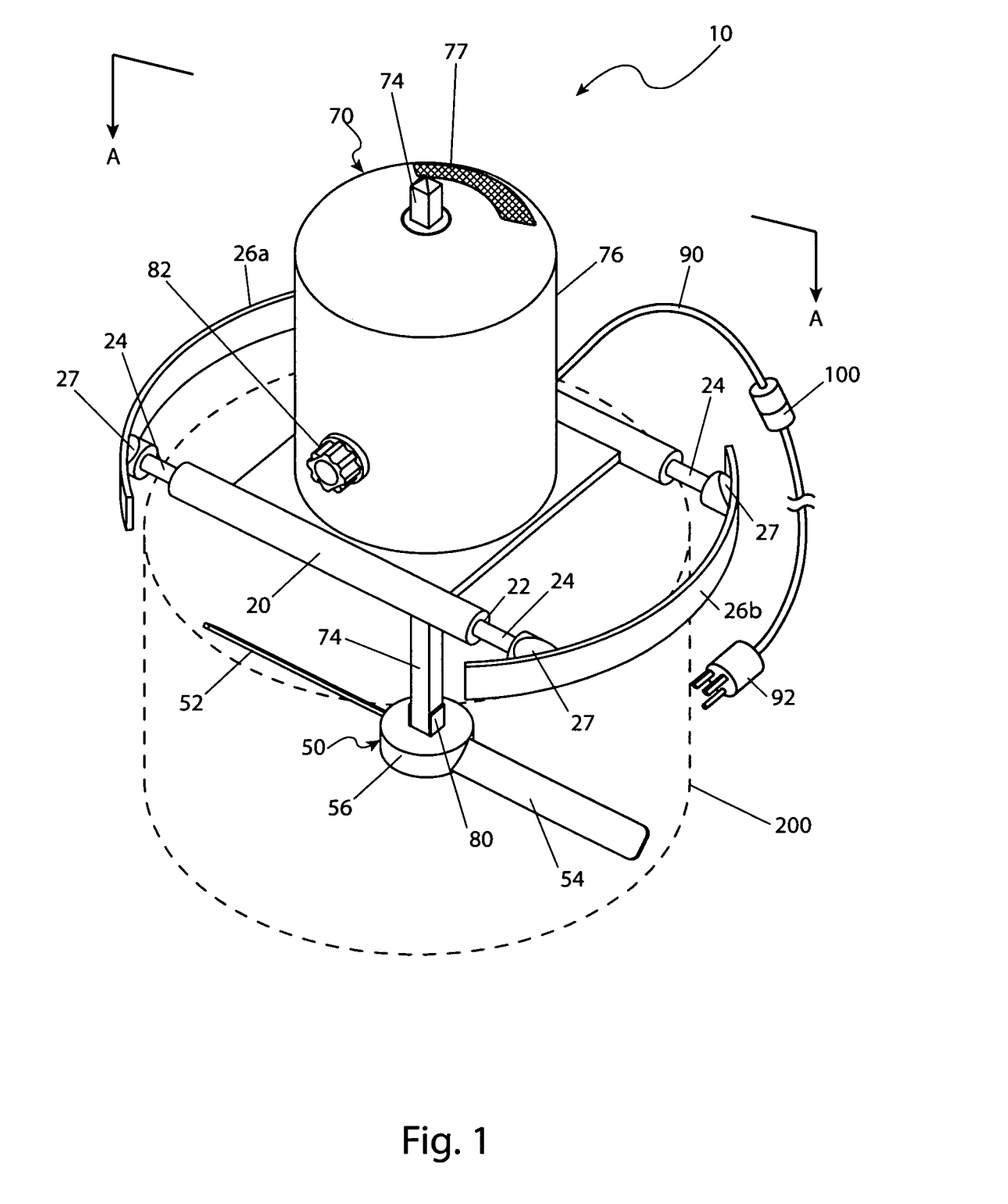
FIG. 1 is a perspective view of an electric mixer in accordance with the present invention.
Figure 2:
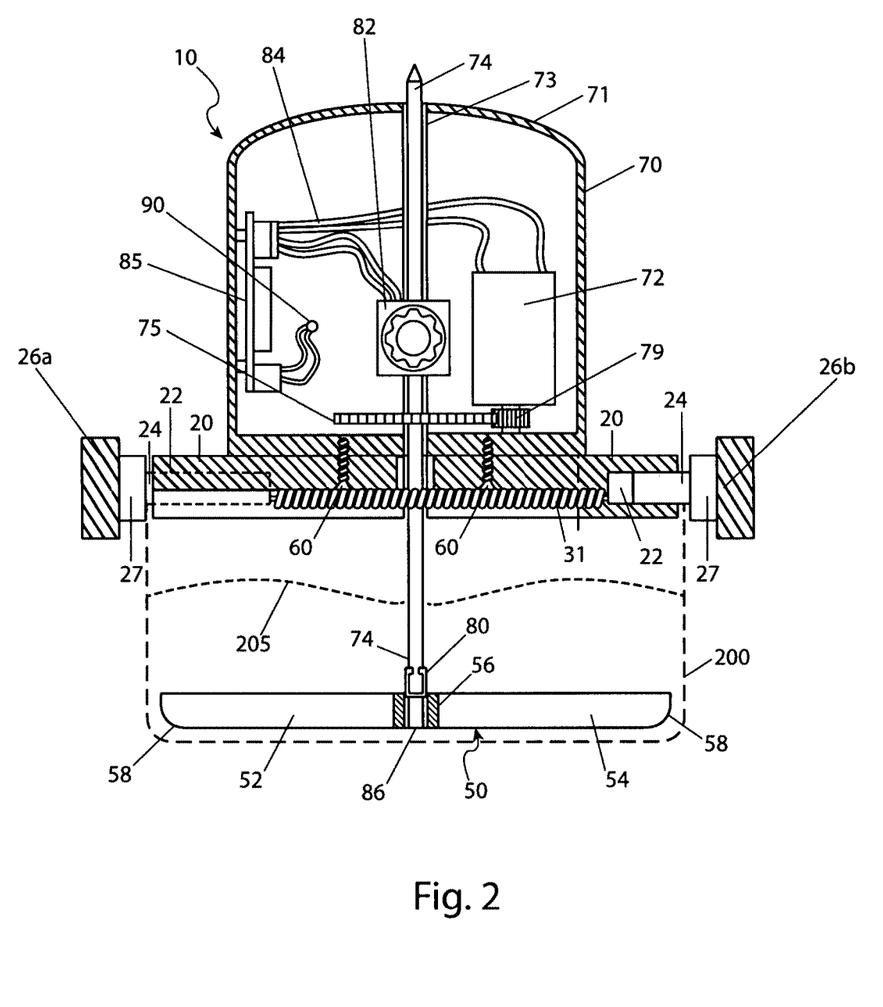
FIG. 2 is a section view of the electric mixer taken along section line A-A of FIG. 1.

Referring now to FIGS. 1 and 2, the apparatus 10 can include a rectangular-shaped mounting plate having opposed tubes 20 positioned in a horizontal manner over an open top of a cooking vessel 200. The mounting plate having opposed tubes 20 can be clamped to sides of a variety of differently shaped and sized cooking vessels 200. The mounting plate having opposed tubes 20 includes a first clamping plate 26a and an opposing second clamping plate 26b to engage edge portions of the sides of the vessel 200. Each clamping plate 26a, 26b can be made using a metal material such as stainless steel, aluminum, or the like, capable of withstanding cooking temperatures. Each clamping plate 26a, 26b can include an arcuate shape which extends around curved side surfaces of the cooking vessel 200 in a generally parallel manner. Alternatively, each clamping plate 26a, 26b can include a flat profile which extends along straight side surfaces of the cooking vessel 200 in a generally parallel manner.

Each clamping plate 26a, 26b can include a pair of mounting ears 27 to receive a respective pair of integral and perpendicularly extending rods 24. Each pair of rods 24 is inserted into corresponding apertures 22 of the mounting plate having opposed tubes 20. The apertures 22 can be formed or machined into opposing side surfaces of the mounting plate having opposed tubes 20. The pairs of rods 24, along with a respective clamping plate 26a, 26b, are inserted into the apertures 22 in an independently adjustable manner and secured in position using a retention spring 31 located internal to the mounting plate having opposed tubes 20 within the corresponding apertures 22. Such an arrangement provides for a secure attachment of the apparatus 10 to the cooking vessel 200 as well as provide for automatic centering during use. Such self-centering action is critical to ensure satisfactory operation during the stirring process and allows for easy adaption to any size cooking vessel 200 regardless of diameter. The retention spring is fastened to the interior end of each pair of extending rods 24.

During initial installation within the cooking vessel 200, the contracting effect of the retention spring 31 is affected by the user to place the apparatus 10 in place. The clamping plates 26a, 26b are then carefully released securing said plates and the mounting plate having opposed tubes 20 against the cooking vessel 200.

The mounting plate having opposed tubes 20 provides an attachment means to a cylindrical motor assembly 70 along a top surface. Said motor assembly 70 comprises a downwardly extending shaft portion 74, which in turn rotates an attached interchangeable mixing paddle assembly 50 to stir the food stuffs 205. Said shaft 74 is envisioned to be of a square cross section for ease of connection and maximum torque transfer.

The mixing paddle assembly 50 includes a propeller-like structure having a central hub 56 with and integral first blade 52 and second blade 54 which extend in opposite directions along a coincidental vertical plane. The paddle assembly 50 can be interchangeable and be introduced in several widths (minimum of four (4)), as aforementioned described, which correspond to inner diameters of various cooking vessels 200. The hub 56 is removably attached to a bottom end of the shaft 74 via a clip assembly 80, thereby providing quick removal and interchangeability. Each blade 52, 54 of the paddle assembly 50 can include a flat plastic structure having a slight tilt from vertical, being designed to promote lifting and circulation of the food stuffs 205 during mixing. Additionally, the bottom outer corner of each blade 52, 54 can include a curve feature 58 which geometrically corresponds to a curvature at a bottom corner of the cooking vessel 200.

Figure 7:
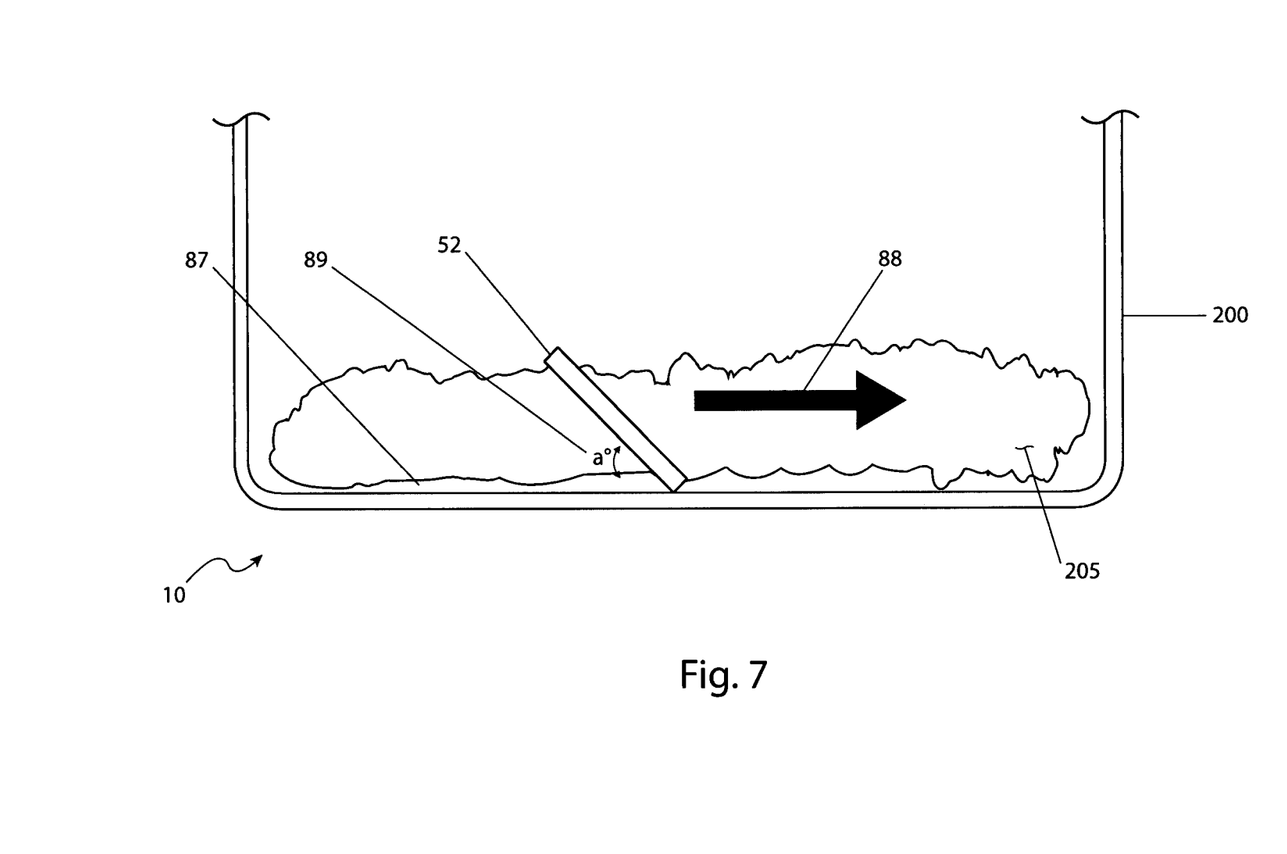

Referring to FIG. 7, a cross sectional view of the first blade 52 is shown as seen along a line B-B, as shown in FIG. 1. While the first blade 52 is depicted, it should be noted that the opposing view would depict the second blade 54 in a similar arrangement due the symmetry of the first blade 52 with that of the second blade 54 which comprise the blade assembly 50. The first blade 52 moves along an interior bottom surface 87 of the cooking vessel 200 as shown by a travel path "t" 88. The first blade 52 is positioned at a paddle approach angle "a" 89. Said paddle approach angle "a" is envisioned to be approximately forty-five degrees (45°). However, other paddle approach angles "a" 89 are possible and as such, any specific angle is not intended to be a limiting factor of the present invention. Said positioning of the first blade 52 allows for foodstuffs 205 to be stirred from the bottom of the cooking vessel 200 as well as be mixed together by guiding passage of the foodstuffs 205 up and over the first blade 52 as it moves along the travel path "t" 88.

The shaft 74 of the motor assembly 70 provides a means to vertically position the mixing paddle assembly 50 in a variable manner. The shaft 74 preferably comprises a linear metal component having a square cross-section, or similar shape being inserted into a hollow sleeve 73 within the motor assembly 70 in a non-rotating manner as seen in FIG. 2. The hollow sleeve 73 can include a correspondingly shaped center opening which extends up through top and down through bottom portions of the motor assembly 70. In use, the shaft 74 is slidingly inserted into a bottom opening of the hollow sleeve 73. The vertically sliding shaft 74 and attached mixing paddle assembly 50 are rotated as the hollow sleeve 73 is rotated in a conventional manner by the motor assembly 70. The shaft 74 and mixing paddle assembly 50 "float" along a vertical axis until resting upon a bottom surface of the cooking vessel 200, thereby automatically compensating for various heights of cooking vessels 200. Additionally, the shaft 74 includes a ball-end feature 86 being approximately one-sixty-fourth of an inch (1/64 in.) in diameter which rests upon a bottom surface of the cooking vessel 200, thereby providing a small gap above the bottom surface of the cooking vessel 200 and allowing the shaft 74 and paddle assembly 50 to make single-point contact with the cooking vessel 200 in a non-damaging manner.

Figure 6:
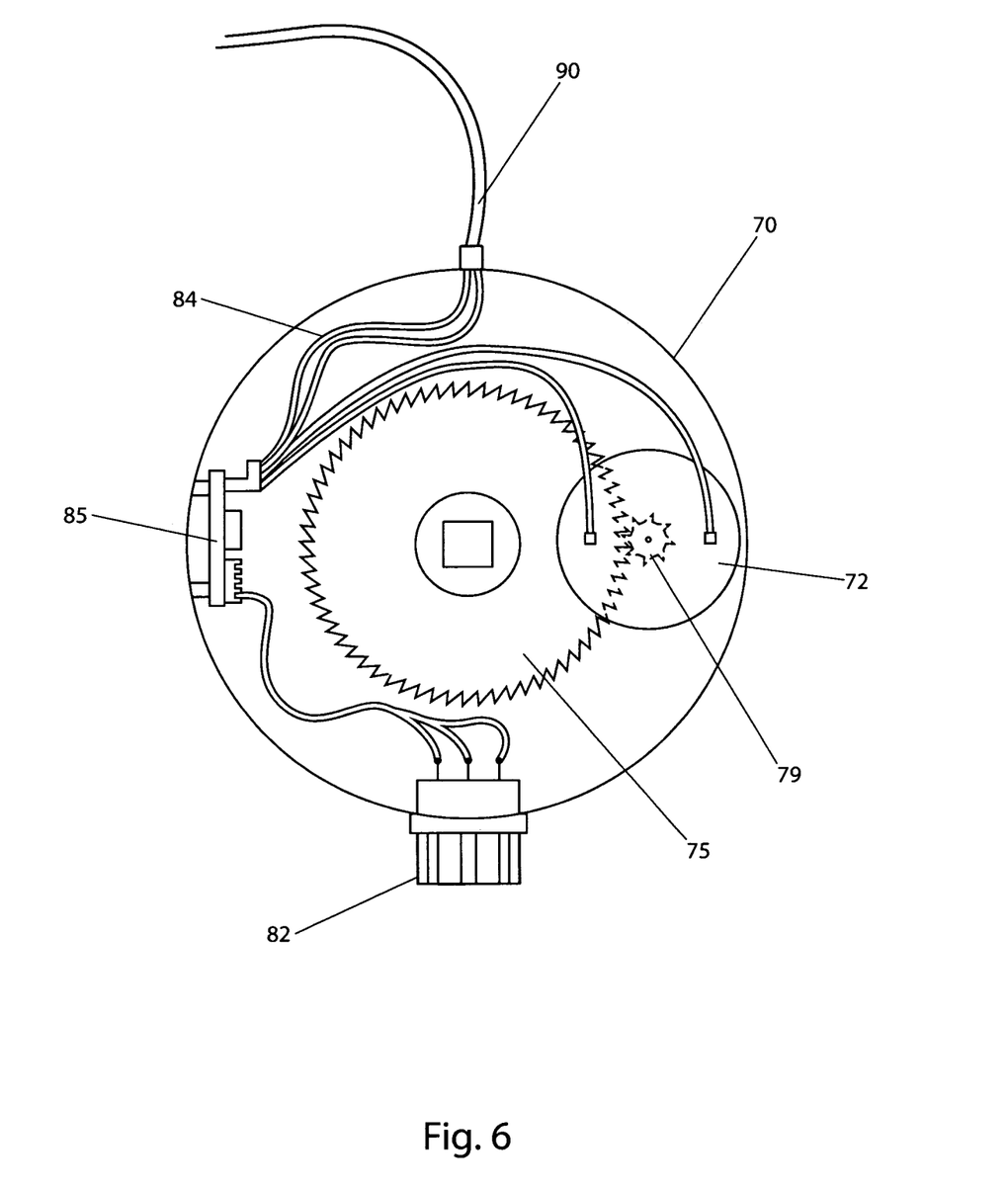
FIG. 6 is an interior view of the motor housing 70 as used with the electric mixer; and, FIG. 7 is a cross sectional view of the mixing paddle assembly 50 taken along section line B-B of FIG. 1.

The motor assembly 70 is attached to the mounting plate having opposed tubes 20 via a plurality of first fasteners 60 such as bolts. The motor assembly 70 is centered upon a top surface of the mounting plate having opposed tubes 20 and extends upwardly therefrom. The motor assembly 70 includes a cylindrical-shaped motor housing 76 which contains a conventional internal gear reduction brushless motor 72, a hollow sleeve 73 which is driven by a shaft gear 75 and a motor gear 79. Furthermore, the motor assembly 70 includes motor cooling and control portions being conveniently located along a domed shape cover 71 including a screen-type air vent 77, a variable speed switch with integral power switch 82 along with a variable speed control board 85 which allows the gear reduction brushless motor 72 to operate at an infinitely variable variety of rotary speeds, thereby enabling a user to select a suitable paddle assembly 50 speed for mixing various foodstuffs 205 such as soups, sauces, and the like in an automatic fashion. It is envisioned that lower (slower) speeds would be utilized for foodstuffs 205 such as stews and rues, while medium speeds would be utilized for foodstuffs 205 such as risottos, and higher (faster) speeds would be utilized for foodstuffs 205 such as puddings and cheese sauces.

Figure 4:
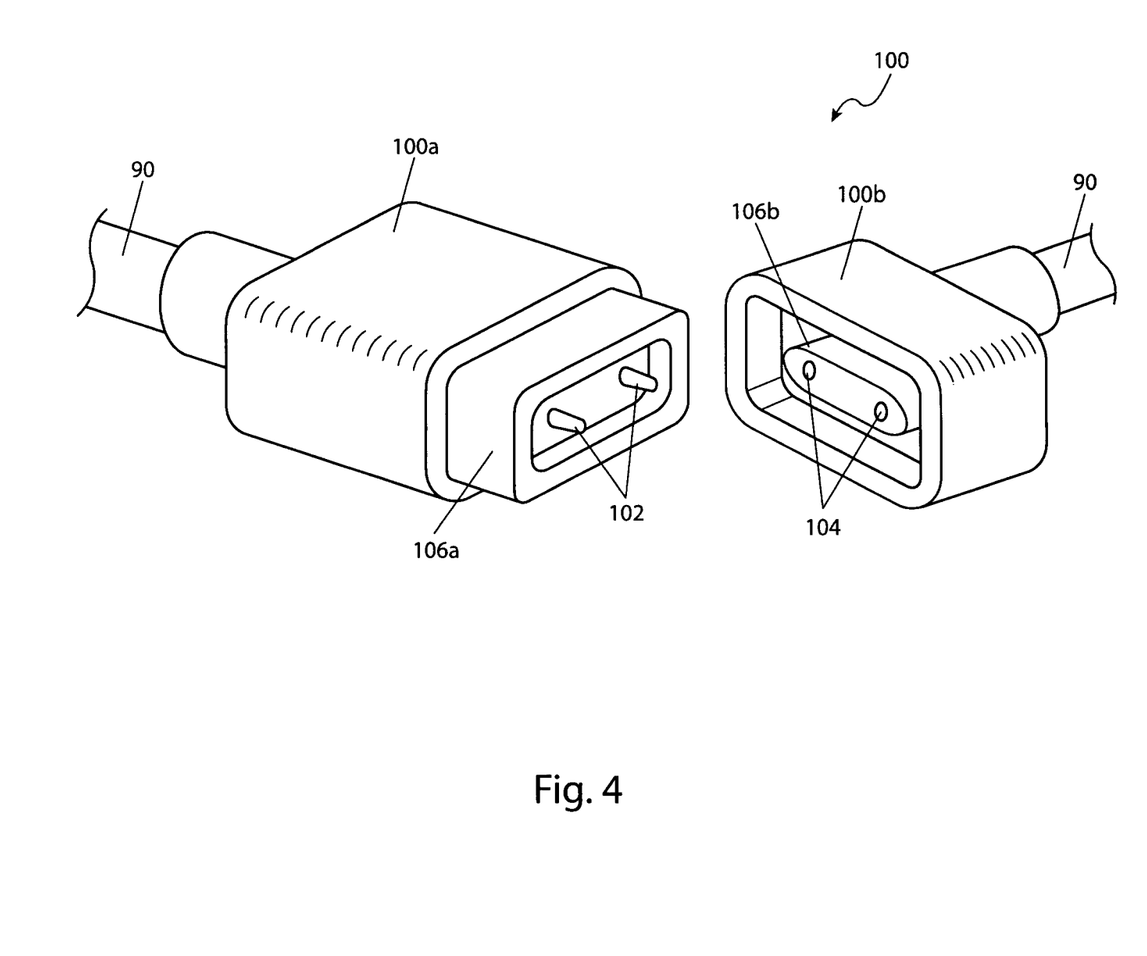
FIG. 4 is a close-up view of a safety connector of the electric.
Figure 5:
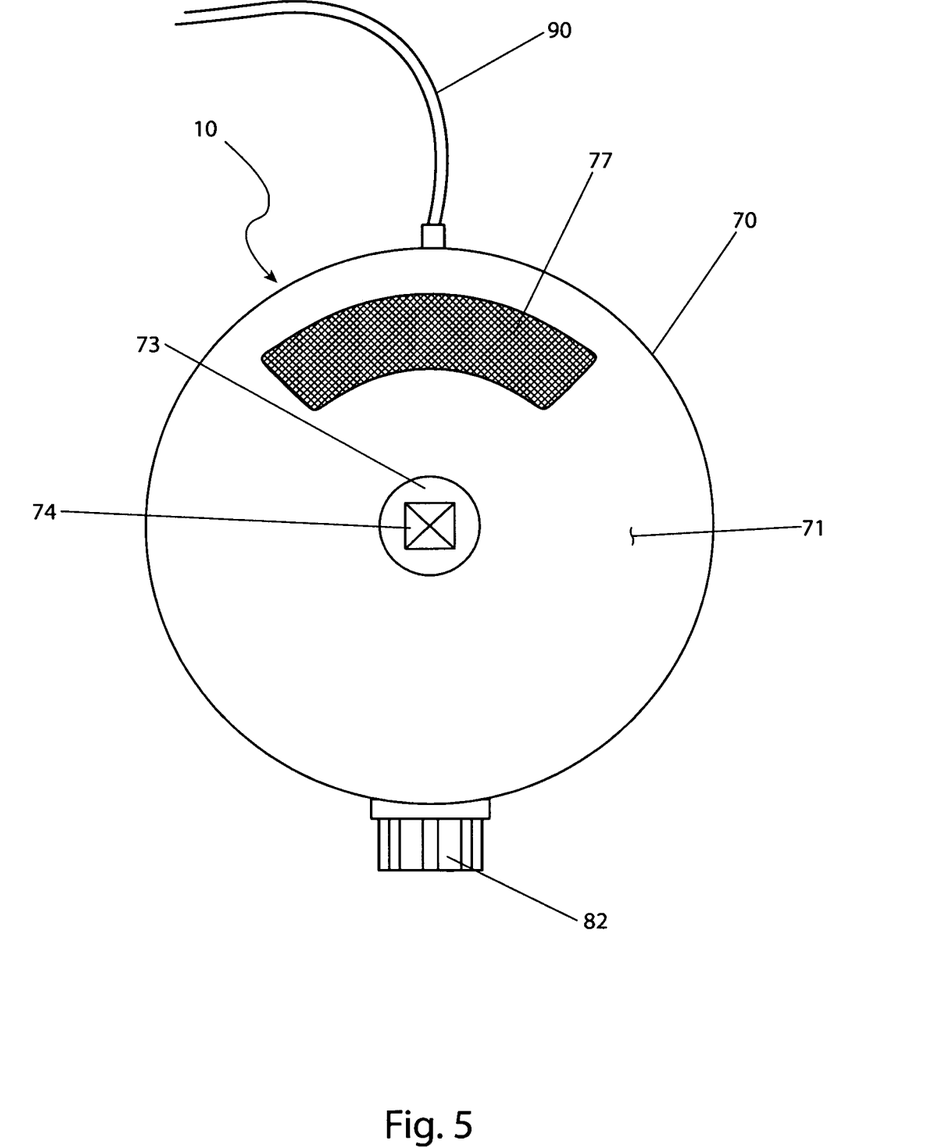
FIG. 5 is a partial top view of the top view of the electric mixer.

Referring now to FIG. 4, the apparatus 10 can include a power cord 90 having a magnetic safety connector 100 located at an intermediate position upon the power cord 90 which provides a means for safe emergency disconnection of electricity to the apparatus 10 in an event that the power cord 90 becomes entangled. The safety connector 100 can include a shielded and magnetically joined electrical connector being similar to the MAGSAFE® connector made by APPLE®, or equivalent device. The safety connector 100 includes a first half connector 100a having a plurality of pins 102 and a first magnet 106a, and a second half connector 100b having a plurality of sockets 104 and a second magnet 106b.

Figure 3:
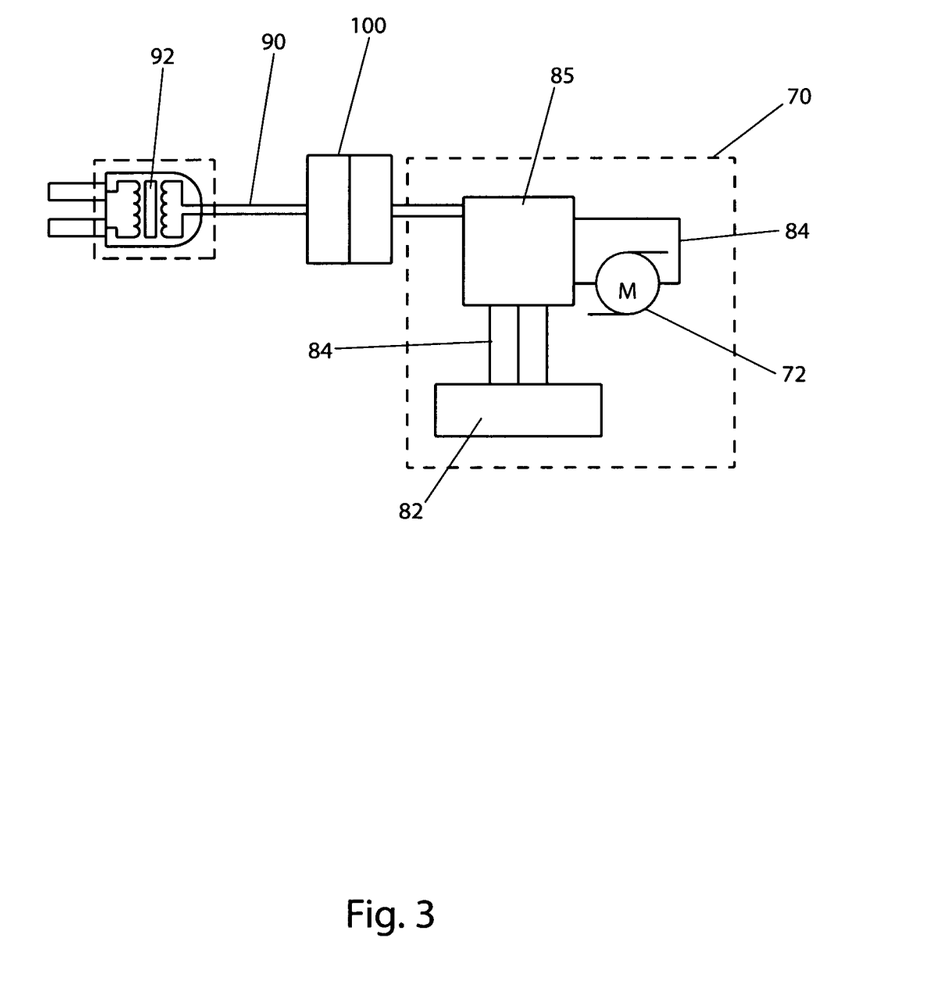
FIG. 3 is an electrical block diagram illustrating the major electrical components of the electric mixer.

Referring now to FIG. 3, power is routed through the variable speed switch with integral power switch 82, along with a variable speed control board 85 which allows the gear reduction brushless motor 72 to operate at a user-selected revolutions per minute (RPM) as well as allow for ON/OFF control of the apparatus 10. The gear reduction brushless motor 72, variable speed control board 85, and variable speed switch with integral power switch, 82 can be interconnected using wiring 84 being in electrical communication with the power cord 90 and a 110-volt outlet plug 92. Such AC powered operation of the apparatus 10 is envisioned to be advantageous over battery powered operation due to lack of battery replacement and/or battery recharging. This represents an overall advantage in operation costs, especially on a continuous operation cycle as well as lack of worry about depleted batteries during the middle of a usage cycle.

It is envisioned that other styles and configurations of the disclosed apparatus 10 can be easily incorporated into the teachings of the present disclosure, and only certain particular configurations have been shown and described for purposes of clarity and disclosure and not by way of limitation of scope.

The disclosed apparatus 10 can be installed and utilized by the user in a simple and effortless manner with little or no training. After initial purchase or acquisition of the apparatus 10, it can be installed and utilized as indicated in FIGS. 1-7.

The method of installing and utilizing the apparatus 10 may be achieved by performing the following steps: procuring a model of the apparatus 10 having a desired number of paddle assemblies 50 of desired sizes which correspond to various existing cooking vessels 200; selecting a particular paddle assembly 50 which provides a desired fit within the existing cooking vessel 200 onto which the apparatus 10 is being mounted; removing the shaft 74 from the motor assembly 70, if previously installed; mounting and securing the previously selected paddle assembly 50 to the shaft 74 by utilizing the clip assembly 80 through hub 56 and shaft 74 portions; loading a desired type and amount of food stuffs 205 into the cooking vessel 200; inserting the shaft 74 into a bottom opening portion of the hollow sleeve 73 of the motor assembly 70 until a top end of the shaft 74 protrudes from a top opening portion of the hollow sleeve 73 as visible along the dome shaped cover 71; grasping and holding a top end of the shaft 74 to retain the shaft 74 and paddle assembly 50 within the motor assembly 70 and dome shaped cover 71; inserting the shaft 74 and paddle assembly 50 into the cooking vessel 200; overcoming the pressure of the retention springs 31; guiding the clamping plates 26a, 26b along upper outer edge portions of the cooking vessel 200 until the apparatus 10 is resting upon an upper edge of the cooking vessel 200; releasing and allowing the clamping plates 26a, 26b to obtain firm contact with the cooking vessel 200; releasing and allowing the shaft 74 to descend and the ball-end feature 86 to contact the bottom surface of the cooking vessel 200; placing the cooking vessel 200 and apparatus 10 upon an existing oven range for normal cooking, simmering, or the like; inserting the power plug 92 of the power cord 90 into an available 110-volt outlet; activating the apparatus 10 by rotating the variable speed switch with integral power switch 82 to a slowest setting and increasing rotation of the speed switch with integral power switch 82 until the paddle assembly 50 is rotating at a desired speed based upon a type of food stuffs 205 and cooking process; allowing the apparatus 10 to mix the food stuffs 205 for a period of time during cooking of the food stuffs 205 in a desired manner; deactivating the variable speed switch with integral power switch 82; overcoming the pressure of the retention springs 31 until the apparatus 10 is free and may be lifted from the cooking vessel 200; lifting the apparatus 10 from the cooking vessel 200; and removing the shaft 74 and paddle assembly 50 portions for washing.

The foregoing embodiments of the disclosed electric mixer have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments of the disclosed baluster bracket assembly shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. An electric mixing apparatus for stirring the contents of a cooking vessel comprising:
   a mounting plate having a first and a second tube arranged on opposite sides thereof, each tube having a first aperture and a second aperture;
   a first rod extending from said first aperture of said first tube;
   a second rod extending from said second aperture of said first tube;
   a third rod extending from said first aperture of said second tube;
   a fourth rod extending from said second aperture of said second tube;
   a first arcuate clamping plate attached to said first rod and said third rod;
   a second arcuate clamping plate attached to said second rod and said fourth rod;
   a first elongation spring having two ends within said first tube connected to said first rod and to said second rod;
   a second elongation spring having two ends within said second tube connected to said third rod to said fourth rod;
   a motor assembly attached to said mounting plate; and,
   a paddle assembly connected to and rotatably driven by said motor assembly via a shaft defining an axis;
   wherein said mixing apparatus is capable of clamping to an external sidewall of said cooking vessel; and,
   wherein said elongation springs cause said paddle assembly to center when said apparatus is clamped to said cooking vessel.

2. The apparatus of claim 1, wherein two ends of said first elongation spring are fixed to said first rod and said second rod, respectively, and the two ends of said second elongation spring are fixed to said third rod and said fourth rod, respectively.

3. The apparatus of claim 1, wherein said motor assembly comprises:
   a brushless motor attached to said mounting plate and said shaft; and,
   a hollow sleeve driven by a gear surrounding said hollow sleeve and meshing with a motor gear coupled to the motor;
   wherein the shaft extends downwardly from said hollow sleeve; and
   wherein said paddle assembly is attached to said shaft.

4. The apparatus of claim 3, further comprising a variable speed switch and a power switch capable of providing electrical communication between said brushless motor and a power source.

5. The apparatus of claim 3, wherein said hollow sleeve receives said shaft, wherein said shaft is secured within said hollow sleeve and is movable along a longitudinal direction within said hollow sleeve.

6. The apparatus of claim 1, wherein said paddle assembly further comprises:
   a central hub removably attached to an end of said shaft; and,
   at least one pair of opposing blades extending outwardly from said central hub.

7. The apparatus of claim 6, wherein said blades are removable from said central hub.

8. The apparatus of claim 6, wherein said blades are oriented at a 45° angle with respect to said axis of said shaft.

9. The apparatus of claim 6, wherein an end of each blade opposite said central hub comprises a curved portion.

* * * * *